United States Patent
Yuki et al.

(10) Patent No.: US 9,916,512 B2
(45) Date of Patent: Mar. 13, 2018

(54) INFORMATION PROCESSING APPARATUS, PROCESSING SYSTEM, OBJECT MOVING SYSTEM, AND OBJECT MOVING METHOD

(71) Applicant: CANON KABUSHIKI KAISHA, Tokyo (JP)

(72) Inventors: Hiroyuki Yuki, Utsunomiya (JP); Shinji Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/051,549

(22) Filed: Feb. 23, 2016

(65) Prior Publication Data

US 2016/0253562 A1 Sep. 1, 2016

(30) Foreign Application Priority Data

Feb. 27, 2015 (JP) .................................. 2015-039404

(51) Int. Cl.
| | |
|---|---|
| *G06K 9/20* | (2006.01) |
| *G06K 9/62* | (2006.01) |
| *G06K 9/32* | (2006.01) |
| *B25J 9/16* | (2006.01) |
| *G06T 7/73* | (2017.01) |

(52) U.S. Cl.
CPC .......... *G06K 9/2036* (2013.01); *B25J 9/1679* (2013.01); *B25J 9/1697* (2013.01); *G06K 9/3241* (2013.01); *G06T 7/73* (2017.01); *G05B 2219/40053* (2013.01); *G06K 2209/19* (2013.01); *G06K 2209/401* (2013.01); *G06T 2207/10016* (2013.01); *G06T 2207/30164* (2013.01); *Y10S 901/09* (2013.01); *Y10S 901/47* (2013.01)

(58) Field of Classification Search
CPC ......... B25J 19/023; G05B 2219/40053; G05B 2219/37555; G05B 2219/45063; G05B 2219/37567; G06T 2207/30164; G06T 1/0014
See application file for complete search history.

(56) References Cited

U.S. PATENT DOCUMENTS

2013/0094932 A1* 4/2013 Kutsukake ............. B25J 9/1697
414/680

FOREIGN PATENT DOCUMENTS

| JP | 4199264 B2 | 12/2008 |
|---|---|---|
| JP | 5201411 B2 | 6/2013 |

* cited by examiner

*Primary Examiner* — Brian P Werner
(74) *Attorney, Agent, or Firm* — Canon U.S.A., Inc. IP Division

(57) ABSTRACT

A moving method for moving a plurality of objects by repeating a process of capturing an image of objects, recognizing a position of an object using the image acquired by image capturing, and moving the recognized object includes acquiring an image of a plurality of objects randomly placed in a first state in each of a first space and a second space partitioned from each other, setting a first partial area corresponding to the first space and a second partial area corresponding to the second space in an entire area of the image in the first state, recognizing a position of a first object in the first partial area and a position of a second object in the second partial area using the image in the first state, and moving the recognized first and second objects using a robot.

7 Claims, 10 Drawing Sheets

INFORMATION PROCESSING APPARATUS, PROCESSING SYSTEM, OBJECT MOVING SYSTEM, AND OBJECT MOVING METHOD

BACKGROUND

Field

Aspects of the present invention generally relate to an information processing apparatus, a processing system, an object moving system, and an object moving method.

Description of the Related Art

In recent years, increasing number of robots are coming to perform an operation for picking out works (objects), which are randomly placed (stacked) without being arrayed, one by one from a pallet (box) and an operation for arranging works, on behalf of human operators in assembly lines of industrial products. A work moving system using such a robot captures an image of a plurality of works randomly placed in various orientations in the pallet (box) (imaging process). Then, the work moving system processes the image obtained by image capturing to acquire two- or three-dimensional information of the works. Then, the work moving system performs calculations for obtaining positions and orientations of the works using the acquired information to recognize positions and orientations of the works (recognition process). Then, the work moving system controls a robot manipulator so that recognized works are picked up from the pallet and arrayed (picking process).

When a specific work among a plurality of randomly placed works is held and moved and in a case where the held work contacts other work or in a case where weight imbalance occurs between the other works due to movement of the specific work, the state of the plurality of the randomly placed other works collapses. Consequently, positions and orientations of the plurality of the randomly placed other works are changed. Therefore, the imaging process and the recognition process need to be performed again before moving the next work. Accordingly, the total time (takt time) for holding and moving a plurality of works is prolonged.

For solving this problem, Japanese Patent No. 4199264 discusses a provision of a determination unit for determining whether a state of randomly stacked works has changed. Japanese Patent No. 4199264 discusses that when the state of the randomly stacked works is determined, to have not changed, the works are detected using an image captured in the past and the next work is picked out without performing an imaging process. Japanese Patent No. 5201411 discusses that after a work is picked out from a pallet, a two-dimensional image of works is captured and, when the difference between the captured image and another two-dimensional image captured before picking out the work is within an allowable range, the next work is picked out without distance measurement performed with laser.

However, according to the inventions discussed in Japanese Patent No. 4199264 and Japanese Patent No. 5201411, there is required a process of capturing images of the randomly stacked works and recognizing positions of the works again and then moving the works, in a case where the state of the randomly stacked works collapses after movement of a work performed from where works are randomly placed. More specifically, it is necessary to perform image capturing and recognition of works each time when the state of randomly stacked works collapses. Further, it takes a time for determining whether the state of randomly stacked works has changed even if the state of randomly stacked works has not collapsed. Therefore, according to the inventions discussed in Japanese Patent No. 4199264 and Japanese Patent No. 5201411, it still takes a long period of time from when a plurality of works is captured until when movement of a work is completed.

SUMMARY

Aspects of the present invention are directed to providing an information processing apparatus, a processing system, an object moving system, and an object moving method for shortening the time period from when images of a plurality of objects are captured until when object movement is completed.

According to an aspect of the present invention, an information processing apparatus includes an acquisition unit configured to acquire a captured image of objects, a recognition unit configured to recognize a position of an object using the image, and an instruction unit configured to instruct a moving unit to move the recognized object, wherein the acquisition unit acquires an image captured by image capturing of a plurality of objects randomly placed in a first state in each of a first space and a second space that are partitioned from each other, wherein, in an entire area of the image in the first state, the recognition unit sets a first partial area corresponding to the first space and a second partial area corresponding to the second space based on a partition between the first space and the second space and recognizes positions of a first object in the first partial area and a second object in the second partial area using the image in the first state, and wherein the instruction unit instructs the moving unit to move the recognized first and second objects.

Further features of the aspects of the present invention will become apparent from the following description of exemplary embodiments with reference to the attached drawings.

DESCRIPTION OF THE EMBODIMENTS

Figure 1:
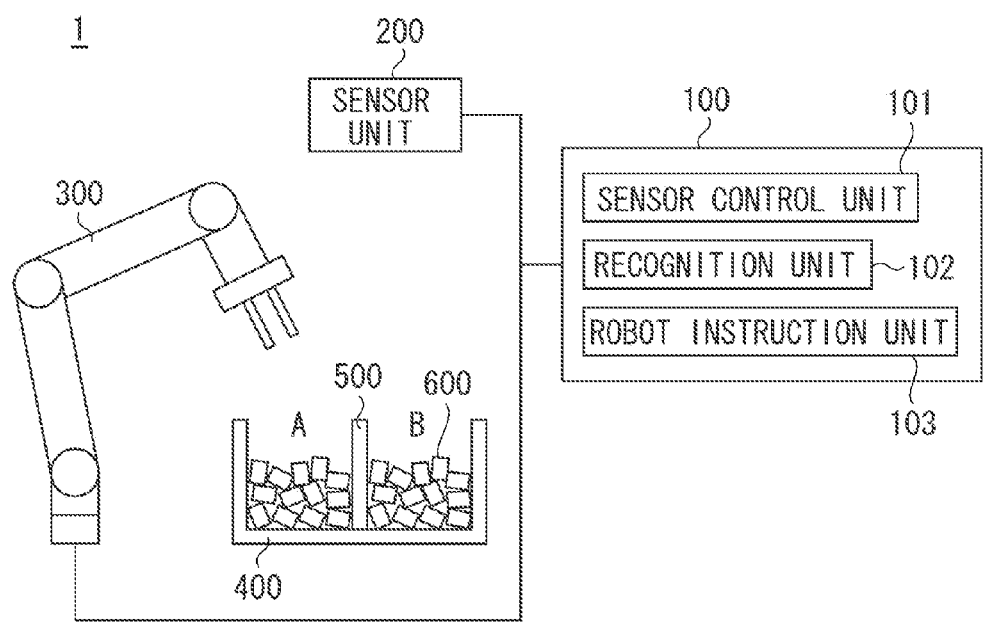
FIG. 1 is a diagram illustrating an object moving system according to a first exemplary embodiment.

FIG. 1 illustrates an object moving system 1 according to a first exemplary embodiment. The object moving system 1 includes a processing unit (information processing apparatus) 100, a distance measurement unit (sensor unit) 200, a robot 300 (moving unit), and a pallet 400. In the object moving system 1, the robot 300 holds each of works (objects) 600 randomly placed in the pallet 400. The robot 300 moves out the works 600 from the pallet 400 and arrays the works 600. The works 600 are, for example, parts of devices.

A processing unit 100 includes a sensor control unit (acquisition unit) 101 for instructing the distance measurement unit 200 and acquiring an image captured by the distance measurement unit 200. The processing unit 100 further includes a recognition unit 102 for recognizing positions of works using the image obtained by image capturing performed by the distance measurement unit 200, and a robot instruction unit 103 for instructing the robot 300 to move the recognized works.

The distance measurement unit 200 includes a plurality of optical systems for triangulation, and is configured to perform distance measurement based on the principle of triangulation. For example, in a case where distance measurement is performed based on the stereo method, the distance measurement unit 200 includes a plurality of optical systems each having an image sensor, such as a charge coupled device (CCD) sensor, and an imaging optical system, such as a lens. In a case where distance measurement is performed based on the pattern projection method, one of the optical systems is an optical system having an image sensor and an imaging optical system, and the other is an optical system having a light source, a pattern generation unit for generating a projection pattern, and a projection optical system.

The robot 300 is, for example, a robot hand or a controlled gripping apparatus having a manipulator (gripping unit) for gripping a work at the tip. The robot 300 may include a plurality of robots. The robot 300 includes a control unit for controlling the robot 300 which enables gripping and moving a work based on input information about the positions and orientations of works. However, the input information is not limited to information about the positions and orientations of works, and may include information about the locus and angle of the manipulator for moving works and information about operation timing of the manipulator.

The pallet 400 is provided with a partition 500 (partitioning member) for partitioning an internal area of the pallet 400. In the present exemplary embodiment, the pallet 400 includes two spaces (a first space A and a second space B) which are partitioned from each other by the partition 500. However, the number of partitioned spaces is not limited to two, and a space may be partitioned into three or more.

Figure 2:
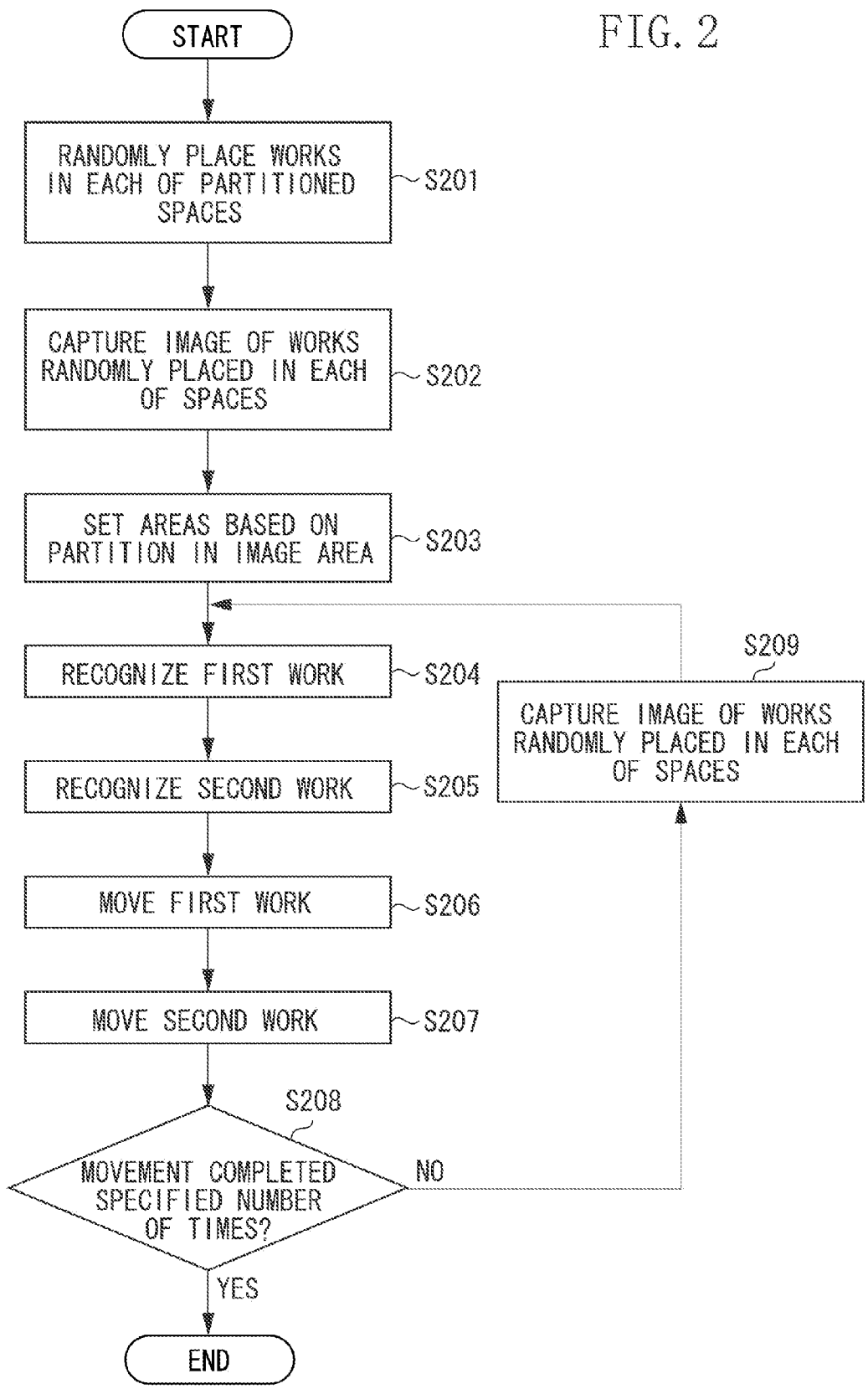
FIG. 2 is a flowchart illustrating an object moving method.

An object moving method using the object moving system 1 will be described below. FIG. 2 is a flowchart illustrating the object moving method. In step S201, an operator randomly places a plurality of works in each of the first space A and the second space B which are partitioned from each other. In the state of works which are randomly placed, the plurality of works is not arrayed but randomly placed in random positions and orientations. In such a state, a plurality of works may or may not mutually overlap, or may be stacked. In the present exemplary embodiment, the plurality of works randomly placed in each of the first space A and the second space B are objects of the same type manufactured based on the same design. However, works are not limited to objects of the same type, and the present exemplary embodiment is also applicable to a case where objects of different types are used.

Image capturing of works will be described below. In step S202, the sensor control unit 101 instructs the distance measurement unit 200 to perform image capturing. Upon reception of the imaging instruction from the sensor control unit 101, the distance measurement unit 200 starts capturing an image of the plurality of works randomly placed in each of the first space A and the second space B in a first state (imaging process). In the case of distance measurement by the pattern projection method, the distance measurement unit 200 projects pattern light on the plurality of works randomly placed in each of the first space A and the second space B to capture an image of the pattern light reflected by the plurality of the works in the imaging view of the image sensor. The distance measurement unit 200 may project the pattern light on the plurality of works in the first space A and the second space B on a collective basis, or on each of the first space A and the second space B at different timings. Upon completion of image capturing of works, the distance measurement unit 200 transmits, to the sensor control unit 101, the image of the plurality of works in the first space A and the second space B in the first state captured in the imaging view.

The sensor control unit 101 acquires the image captured by the distance measurement unit 200 and then transmits the image in the first state to the recognition unit 102. In step S203, in the entire area of the acquired image in the first state, the recognition unit 102 sets a first partial area corresponding to the first space A and a second partial area corresponding to the second space B based on the position of the partition 500 which partitions the first space A and the second space B (setting process). The first and the second partial areas are areas subjected to recognition of positions and orientations of works (recognition target areas), and are partial areas extracted from the inside of the entire area of the image in the first state. Since works are in the pallet 400, the recognition target areas are set to areas inside the pallet 400. Since the pallet 400 is partitioned into a plurality of spaces by the partition 500, a plurality of recognition target areas is set accordingly.

Figure 3:
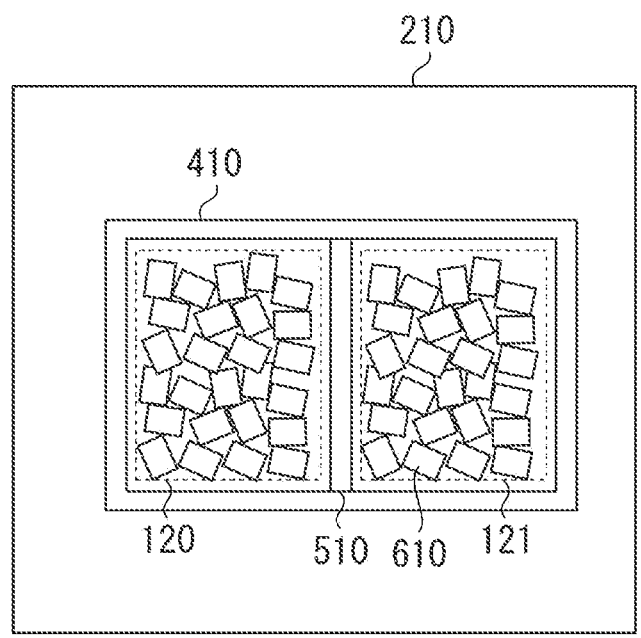
FIG. 3 is a diagram illustrating an image obtained by image capturing.

FIG. 3 is a diagram illustrating an example of setting of recognition target areas. Referring to FIG. 3, an image 210 is an example image obtained by image capturing. The image 210 shows a pallet image 410, a partition image 510, and a work image 610. The recognition unit 102 sets a plurality of recognition target areas corresponding to a plurality of spaces partitioned by the partition 500, using contour information acquired from the pallet image 410 and the partition image 510. More specifically, the recognition unit 102 sets a first partial area 120 corresponding to the first space A and a second partial area 121 corresponding to the second space B. The information used is not limited to the contour information. For example, the recognition unit 102 may calculate the positions and orientations of the pallet 400 and the partition 500 based on information about a distance measurement value, and set a plurality of recognition target areas for each space of the pallet 400 based on the information about the calculated positions and orientations of the pallet 400 and the partition 500. Further, the first partial area 120 may be a specific partial area in the first space A. This also applies to the second space B. Although, in the above-described example, the recognition unit 102 sets recognition target areas in step S203 using the image obtained by image capturing in step S202, a user is able to preregister (prestore) a plurality of recognition target areas in a memory when the placement positions of the pallet 400 and the partition 500 can be fixed with a tool. The user is also able to select recognition target areas from among a plurality of the preregistered recognition target areas. More specifically, in addition to the image captured in step S202, another image is captured for the setting and each area is preset using the image. More specifically, for example, an image of the pallet 400 of when a plurality of works is not present is captured and a boundary including the partition 500 of the pallet 400 is detected. Then, each area is preset based on the detected boundary and the set areas are registered (stored) in the memory. Each of the registered areas is overlapped in the area of the image obtained by image capturing in step S202, so that the recognition target areas are set.

In the present exemplary embodiment, step S203 is performed once, before the first recognition process is performed. Step S203 is on the premise that the positions of the pallet 400 and the partition 500 remain unchanged before completion of movement of works. In this case, step S203 needs to be performed only once since it is not necessary to change the recognition target areas. However, the processing is not limited thereto. When the position of the pallet 400 or the partition 500 has changed, step S203 may be performed a plurality of times in order that the recognition target areas are redefined. Further, for example, in a case where works are collected at one particular position in the pallet while works are picked out from the pallet 400 due to a cone-shaped bottom surface of the pallet 400, step S203 may also be performed a plurality of times for redefining recognition target areas.

In steps S204 (first recognition process) and S205 (second recognition process), the recognition unit 102 refers to and compares information about registered works and information about the distance measurement value and contours acquired through image capturing to recognize (determine) the positions and orientations of works, from among the set recognition target areas. A well-known recognition method is applicable. The recognition unit 102 determines for each object the center position, the edge positions, and the orientation, such as the rotational angle around each axis, using various methods. Then, the recognition unit 102 outputs, stores, and displays each piece of data. The recognition unit 102 determines works or candidate groups to be picked out by the robot 300. Since a plurality of recognition target areas is set, the recognition unit 102 recognizes the positions and orientations of objects and determines works or candidate groups to be moved for each recognition target area. The processing is not limited thereto, and the recognition unit 102 may calculate candidate groups of works to be moved regardless of the recognition target areas, and distinguish the candidate groups based on the recognition target areas. Thus, in the scope of determining works or candidate groups to be moved from each recognition target area based on the information acquired in one imaging process, the algorithm mode can be modified in various ways. The algorithm including such modifications is collectively referred to as a plurality of recognition processes.

Processing for calculating the distance measurement value from the image obtained by image capturing may be performed immediately after the imaging process, immediately after the setting process, or immediately after the recognition process. When the processing is performed immediately after the imaging process, the recognition unit 102 acquires the image obtained by image capturing and then calculates the distance measurement value for the entire area of the acquired image. When the processing is performed immediately after the setting process, the recognition unit 102 may set recognition target areas by, for example, extracting contours from the image and then calculate the distance measurement value only for a range of the set areas. This enables reducing the amount of calculation, thereby resulting in improved efficiency. When the processing is performed immediately after the recognition process, the recognition unit 102 may recognize contours of works by extracting contours from the acquired image and then calculate the distance measurement value only for the inside of the contours or for a limited area including the contours. This enables reducing the amount of calculation, thereby resulting in improved efficiency. The timing of calculating the distance measurement value can be changed in various ways according to the accuracy of distance measurement and contour extraction and to the specifications of a computer.

Then, the robot instruction unit 103 instructs the robot 300 to acquire the information about the positions and orientations of the recognized works from the recognition unit 102 and then hold and move the recognized works. In each step S206 (first movement process) and step S207 (second movement process), the robot 300 holds and moves a randomly placed work according to the instruction from the robot instruction unit 103. The robot 300 performs the movement process a plurality of times according to the number of recognition target areas or recognized works. More specifically, the robot instruction unit 103 instructs the robot 300 to grasp and move the first recognized work (first object) from the first space A in which works are randomly placed, and to grasp and move the second recognized work (second object) from the second space B in which works are randomly placed. In this case, the state of the randomly placed works in the first space A may be changed after the robot 300 has moved a work from the first space A. However, in such a case, since the second space B is partitioned from the first space A by the partition 500, the state of randomly placed works in the second space B is maintained. Even after the robot 300 moves a work from the first space A, the robot 300 is still able to grasp and move a recognized work from the second space B. More specifically, based on the image obtained in one imaging process, the robot 300 is able to move a work from each of the first space A and the second space B.

In step S208, the processing unit 100 determines whether movement of works is completed the specified number of times, whether the specified number of works have been moved, or whether all works have been moved. In a case where the processing unit 100 determines that movement of works is completed (YES in step S208), the processing exits the flowchart. In a case where the processing unit 100 determines that movement of works is not completed (NO in step S208), then in step S209, the processing unit 100 proceeds to the subsequent imaging process. More specifically, upon reception of an imaging instruction from the sensor control unit 101, the distance measurement unit 200 captures an image of a plurality of objects randomly placed in a second state different from the first state in each of the first space A and the second space B. The second state is a state where a first work has been moved from the first space A and a second work has been moved from the second space B, and the positions and orientations of other works may have changed. Then, the processing unit 100 repetitively performs step S204 (recognition process) to step S209 (imaging process). In other words, at least a plurality of recognition processes corresponding to the number of a plurality of set recognition target areas is included in the last imaging process and the subsequent imaging process. One imaging process includes a plurality of processing for acquiring a captured image(s) required to perform distance measurement once, and therefore, the number of images to be acquired is not limited to one. For example, when triangulation by pattern projection is used as a distance measurement method, the spatial coding' method is generally used in pattern projection. To perform distance measurement once, the processing unit 100 projects a plurality of patterns having different periods and then performs processing using a plurality captured images of the patterns, thus achieving distance measurement with sufficient accuracy. Further, to reduce an error occurring at random (random error) due to image sensor noise or environmental fluctuations when distance measurement is performed once, a method for capturing a plurality of images and then averaging a plurality of the captured images is also generally performed. In this way, one imaging process may include processing for capturing a plurality of images for the distance measurement method and processing for capturing a plurality of images to reduce errors.

Conventionally, it has been possible to move the next work only after capturing an image (s) of a plurality of works randomly placed in one space, recognizing the positions of the works based on the image(s) obtained by image capturing, moving the recognized works, and capturing an image(s) of the remaining works in the space. In other words, it has been possible to move only one work in one imaging process.

According to the present exemplary embodiment, since the pallet 400 is partitioned into a plurality of spaces by the partition 500, picking out a work from one space does not change the state of randomly placed works in the other space. Therefore, it is possible to pick out a work from the other space even without performing the imaging process again. Therefore, if a recognition target area is set to each space partitioned by the partition. 500, works can be picked out in such a manner that a work is picked up from each recognition target area, only by performing the imaging process once. This makes it possible to shorten the total takt time from when a plurality of works is captured until when movement of works is completed.

Conventionally, when works of the same type is picked out, works have been randomly placed in a pallet of which space is not partitioned with a partition. Therefore, it has been possible to move only one work from one space in one imaging process for a plurality of works of the same type. In such a case, moving one work may cause collapsing of the state of randomly placed works. On the other hand, in the present exemplary embodiment, a pallet is partitioned into a plurality of spaces even for works of the same type. Therefore, it is possible to perform movement of works a plurality of times in one imaging process, whereby it becomes possible to shorten the total takt time up to when movement of works is completed.

Although, in present exemplary embodiment, a pallet having one partition is used, the pallet is not limited thereto. A pallet having a plurality of partitions may be used.

Figure 4:
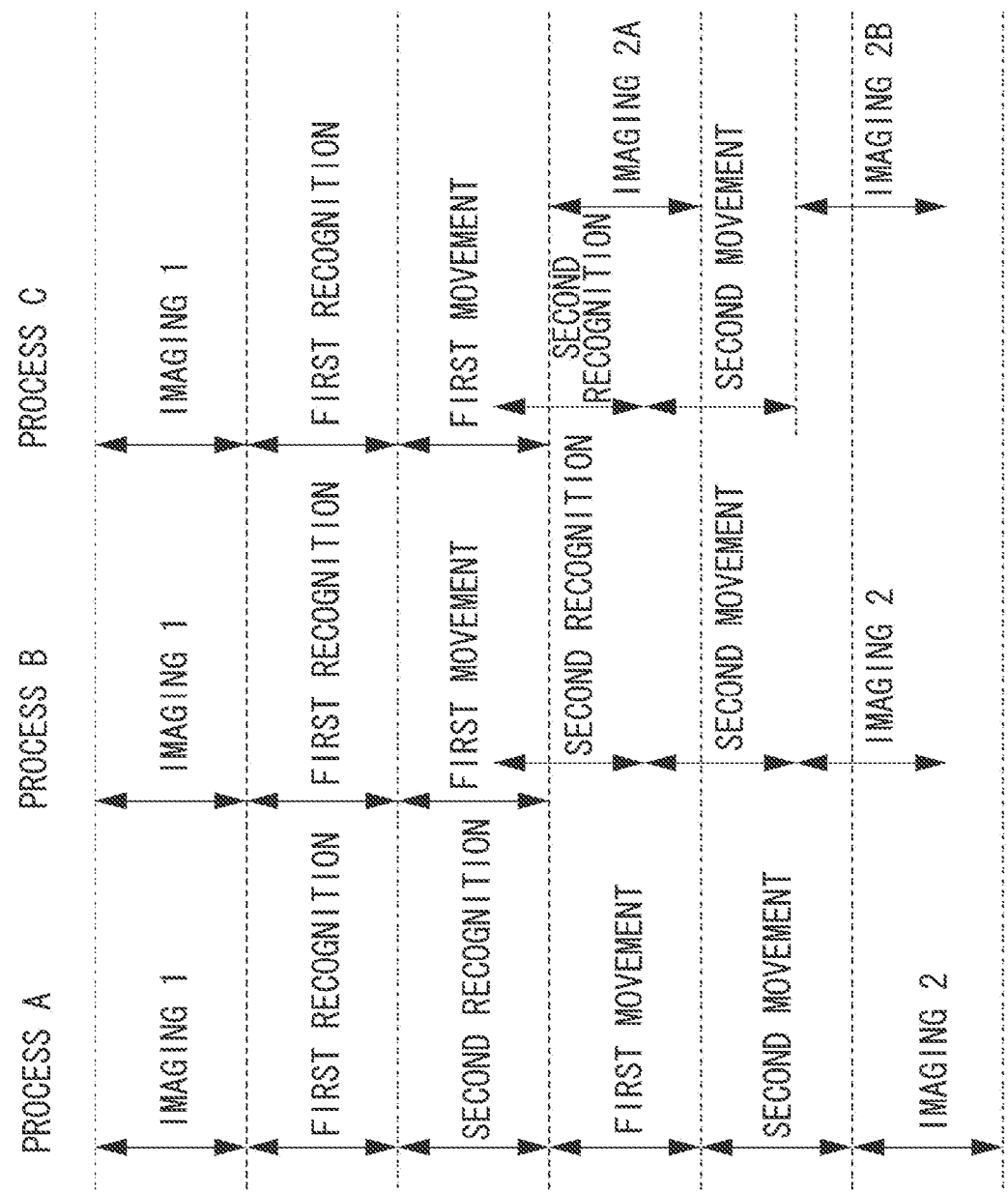
FIG. 4 is a diagram illustrating processes according to the object moving method.

FIG. 4 is a diagram illustrating examples of procedures for performing processes (sequences). Each process is illustrated in time series. To simplify descriptions, the process of setting recognition target areas is omitted.

In the first exemplary embodiment, as illustrated in process A, after completion of the imaging process, the first recognition process for recognizing the position of the first work in the first partial area is performed and then the second recognition process for recognizing the position of the second work in the second partial area is performed. After completion of the second recognition process, the first movement process for moving the first work and then the second movement process for moving the second work are performed, and then imaging process is performed (process A). This procedure is suitable for a case where the recognition process can be repetitively performed in advance for the number of recognition target areas, in particular, for a case where a plurality of recognition processes can be processed in parallel.

In the second exemplary embodiment, as illustrated in process B, the recognition process and the movement process are performed in this order for one recognition target area, and this sequence is repeated for the number of recognition target areas. More specifically, the first movement process is performed after completion of the first recognition process, and the second recognition process is performed after completion of the first movement process is started. Before the first movement process is completed, the second recognition process may be processed in parallel with the first movement process. Then, the subsequent imaging process 2 is performed. This is effective in a case where the movement process and the recognition process can be performed in parallel. This configuration enables the recognition process to be performed on the next recognition target area while the robot 300 is performing a moving operation, whereby it becomes possible to further shorten the total takt time.

As illustrated in process C, an imaging process 2A for capturing an image (s) of works in the first space A may be started after completion of the first movement process and before the second movement process. However, in the imaging process 2A, since the robot 300 has been moving works in the second space B, works in the second space B cannot be captured. Therefore, after completion of the second movement process, an imaging process 2B for capturing an image (s) of works in the second space B is performed. More specifically, after completion of the first imaging process, image capturing for the first space and image capturing for the second space are alternately performed. This makes it possible to perform the imaging processes 2A and 2B in parallel with the recognition process and the movement process, whereby it becomes possible to further shorten the total takt time.

Although the required time periods for the processes are shown as though they are equal among all processes, the required time periods are not limited thereto, and may be different from each other. For example, there is a case where the processing time of the recognition unit 102 is shorter than the moving time by the robot 300. The imaging process may be constantly performed during the recognition process or the movement process.

Figure 5A:
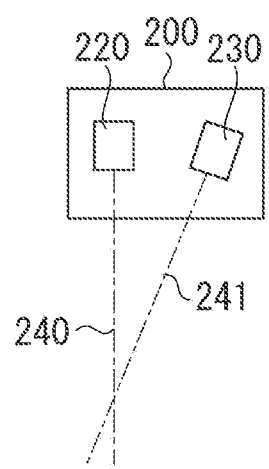
FIG. 5A is a diagram illustrating an example of a configuration of a distance measurement unit.

In the third exemplary embodiment, suitable layout and shape of a partitioning member for partitioning a space into a plurality of spaces will be described below. FIG. 5A is a diagram illustrating a configuration example of the distance measurement unit 200 which includes a first optical unit 220 and a second optical unit 230 and is configured to perform distance measurement based on the principle of triangulation. For example, in a case where distance measurement is performed based on the stereo method, each of the first optical unit 220 and the second optical unit 230 includes an image sensor and an imaging optical system. In a case where distance measurement is performed based on the pattern projection method, either one of the first optical unit 220 and the second optical unit 230 includes an image sensor and an imaging optical system, and the other of them includes a light source, a pattern generation unit for generating a projection pattern, and a projection optical system. The first optical unit 220 provides an optical axis 240, and the second optical unit 230 provides an optical axis 241.

Figure 5B:
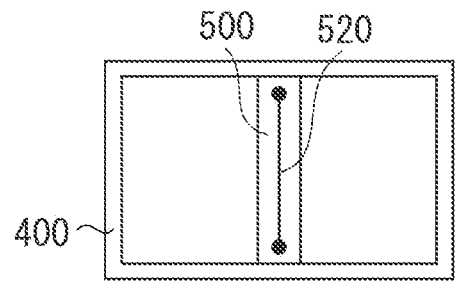
FIG. 5B is a diagram illustrating a layout of a partition.

In a case where the pallet 400 is provided with the partition 500, as illustrated in FIG. 5B, it is desirable to reduce occlusion caused by the partition 500. Occlusion refers to a state where a posterior object is hidden and made invisible by an anterior object. If occlusion occurs, works behind an object cannot be recognized, and therefore recognition and picking by the operator or other means is required. Accordingly, the total takt time for movement of works is prolonged. One of factors of occlusion is the distance between the first optical unit 220 and the second optical unit 230. Occlusion occurs in a direction parallel to the plane including the optical axes 240 and 241. Therefore, in order to reduce occlusion caused by the partition 500, it is desirable to lay out the longitudinal direction 520 of the partition 500 (when viewed in the imaging screen) along the plane including the optical axes 240 and 241.

Since it is difficult for the user to recognize the plane including the optical axes 240 and 241, it is desirable to indicate information about a recommended layout of the partition 500. Examples of indicating method include displaying on a display unit (for displaying an image captured by each optical unit included in the distance measurement unit 200) an image which is generated in such manner that the recommended layout of the partitioning member for partitioning the space is combined in the captured image.

Figure 5C:
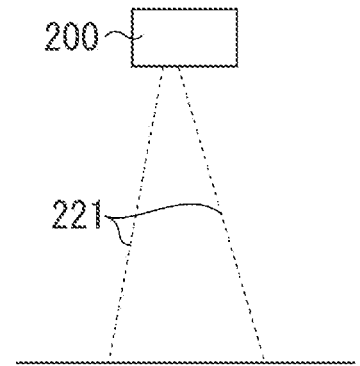
FIGS. 5C and 5D are diagrams each illustrating a configuration example of indicating performed by pattern light projection.
Figure 5D:
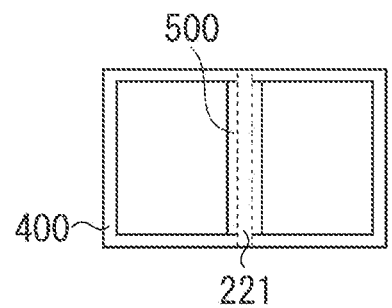

As another example of the indicating method, in a case where the distance measurement unit 200 includes a projection unit, the projection unit generates pattern light for indicating information about the recommended layout of the partitioning member, and the projection optical system projects the pattern light related to the layout of the partitioning member. Projecting the pattern light, to indicate the recommended layout position in the actual pallet layout space in this way enables the user to move the pallet 400 and the partition 500 while directly monitoring the recommended layout position, and therefore it is more desirable. FIGS. 5C and 5D each illustrate a configuration example of indicating performed by pattern light projection. Projection light 221 is pattern light for indicating the recommended layout position of the partition 500. By laying out the partition 500 at the irradiation position of the projection light 221, becomes possible to reduce occlusion caused by the partition 500. Although, in the present exemplary embodiment, the projection light 221 indicates the position of the partition 500, the indicating method is not limited thereto. The projection light 221 may indicate information which indirectly indicates the position of the partition 500. For example, in a case where the partition 500 is fixed to the pallet 400, it becomes possible to indirectly indicate the position of the partition 500 by indicating the position of the pallet 400 so that the partition 500 can be installed at the recommended layout position.

Figure 6:
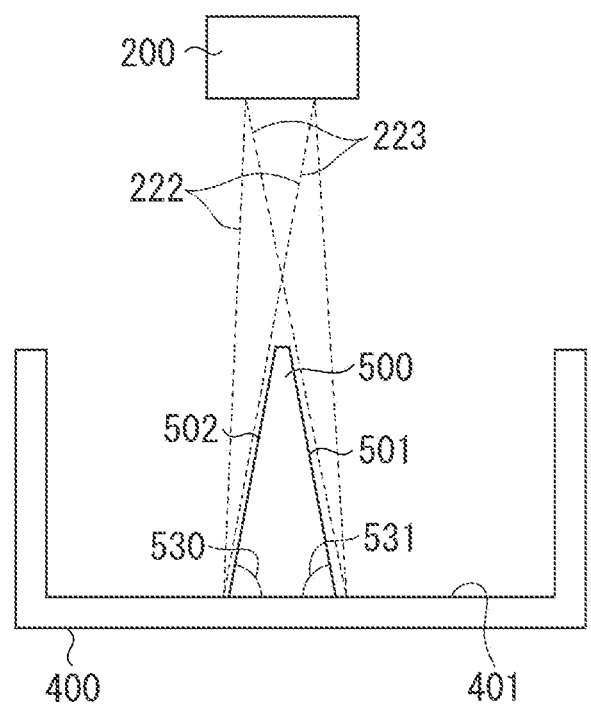
FIG. 6 is a diagram illustrating a shape of the partition.

An example of a preferable shape of a partition will be described below with reference to FIG. 6. FIG. 6 is a cross-sectional view illustrating the partition 500 taken perpendicularly to the longitudinal direction 520 of the partition 500. As described above, in a case where the longitudinal direction 520 is laid out along the plane including the optical axes 240 and 241, the cross section is perpendicular to the plane including the optical axes 240 and 241.

Another factor of occlusion caused by the partition 500 is the influence of the opening of each optical unit included in the distance measurement unit 200. Light fluxes 222 and 223 are examples of fluxes to be used when distance measurement in the vicinity of the partition 500 is performed. Each of the light fluxes 222 and 223 forms a shape that converges in the distance measurement direction according to the size of the opening of each optical unit included in the distance measurement unit 200. When the partition 500 blocks the converging light fluxes 222 and 223 occlusion occurs. The shape of the partition 500 suitable for reducing occlusion has an acute inclination angle 530 formed by a floor 401 (inner bottom) of the pallet 400 and a side surface 502 of the partition 500 and an acute inclination angle 531 formed by the floor 401 (inner bottom) and a side surface 503 of the partition 500.

This configuration reduces the possibility that the partition 500 blocks the light fluxes 222 and 223, whereby it becomes possible to reduce occlusion. More specific numerical values of the inclination angles 530 and 531 may be determined based on the size of opening of the distance measurement unit 200, design values of the optical systems, and light flux blocking permissible values, and can be changed within a range in which acute angle conditions are satisfied. In order to minimize blocking of the light fluxes 222 and 223, it is necessary to set the inclination angles 530 and 531 so that the entire range of the effective diameter of each optical unit included in the distance measurement unit 200 is viewable when the distance measurement unit 200 is viewed from the floor 401 of the pallet 400.

With the above-described configuration, it becomes possible to reduce the occurrence of occlusion and perform recognition of the positions and orientations of works with high accuracy.

Figure 7:
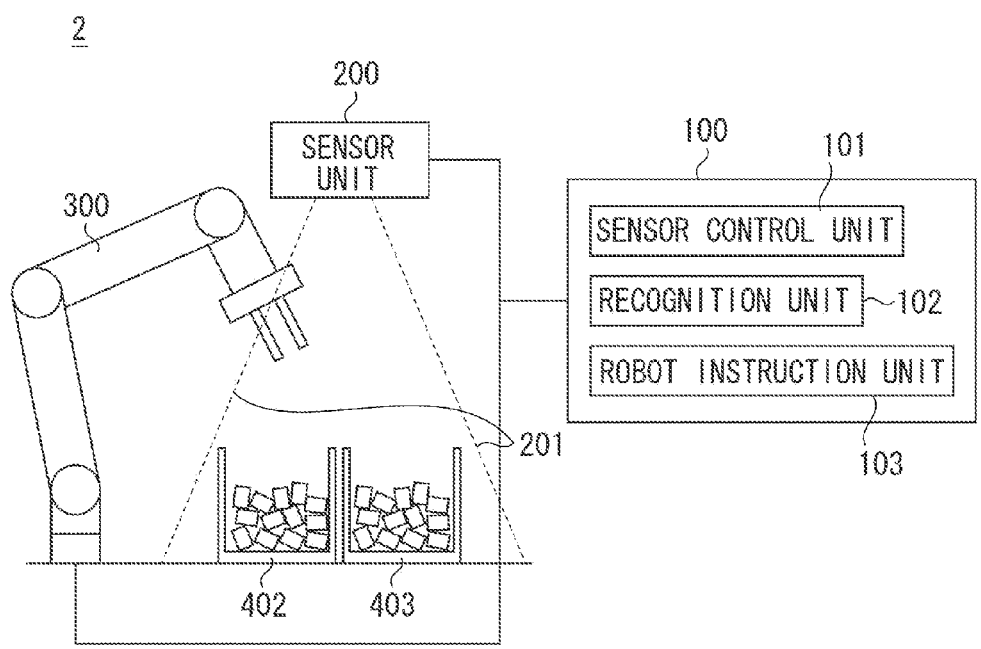
FIG. 7 is a diagram illustrating an object moving system according to a fourth exemplary embodiment.

A fourth exemplary embodiment will be described below with reference to FIG. 7. FIG. 7 illustrates an object moving system 2. In the present exemplary embodiment, instead of the pallet 400 having the partition 500 according to the first exemplary embodiment, a plurality of pallets is laid out within a range of field of view (distance measurement view) in which distance measurement can be performed by the distance measurement unit 200. Other configurations are similar to those according to the first exemplary embodiment. Referring to FIG. 7, pallets 402 and 403 are placed within a range of a distance measurement view 201. With this configuration, since the pallets 402 and 403 are independent of each other, picking out a work from either one of the pallets 402 and 403 does not change the state of randomly placed works in the other one of the pallets 402 and 403. Therefore, a work can be picked out from the other one of the pallets 402 and 403 without performing the imaging process again. Therefore, by setting a recognition target area to each of the pallets 402 and 403, works can be picked out in such a manner that a work is picked up from each of the recognition target areas, only by performing the imaging process once. This makes possible to shorten the total takt time for picking out works. Although, in the present exemplary embodiment, the two pallets 402 and 403 are provided, the configuration is not limited thereto. There may be provided with three or more pallets.

Figure 8:
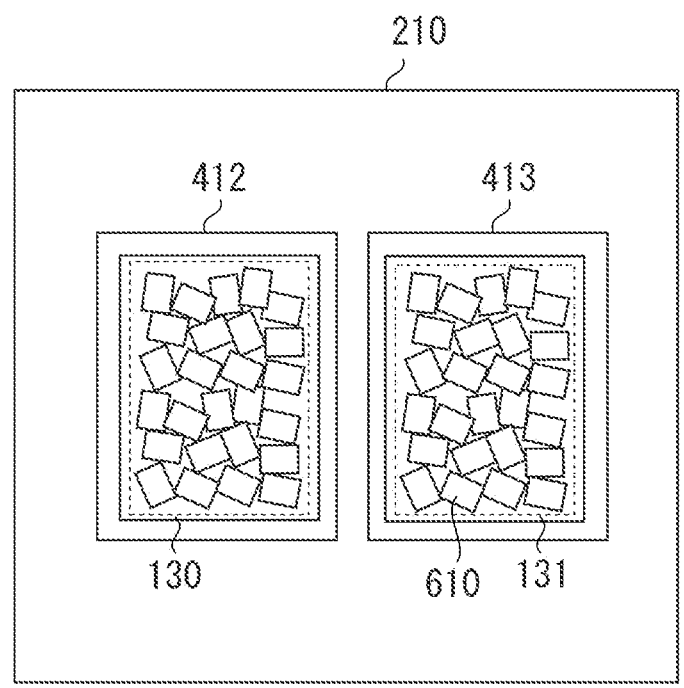
FIG. 8 is a diagram illustrating an image obtained by image capturing according to the fourth exemplary embodiment.

FIG. 8 illustrates a captured image 210 which shows an image 412 of the pallet 402, an image 413 of the pallet 403, and a work image 610. Based on contour information acquired from the images 412 and 413 of the pallets 402 and 403, a plurality of recognition target areas 130 and 131 drawn by dotted lines is set according to the number of pallets. The basis for setting the recognition target areas is not limited to the contour information. For example, the position and orientation of each of the pallets 402 and 403 are calculated based on the information about the distance measurement value, and a recognition target area is set to each of the pallets 402 and 403 based on the calculated position and orientation of each of the pallets 402 and 403.

Figure 9A:
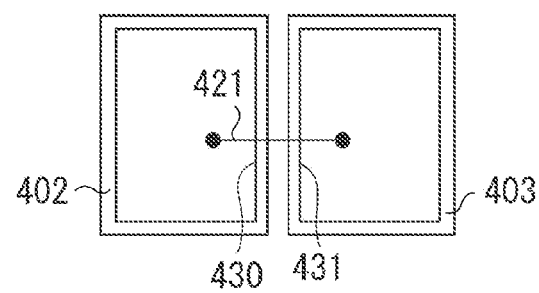
FIG. 9A is a diagram illustrating layouts of a plurality of pallets.

Preferable layouts and shapes of a plurality of the pallets 402 and 403 according to the present exemplary embodiment will be described below with reference to FIGS. 9A to 9D and 10. The configuration of the distance measurement unit 200 is similar to the configuration illustrated in FIG. 5A according to the first exemplary embodiment. More specifically, the distance measurement unit 200 includes the first optical unit 220 and the second optical unit 230. The optical axis 240 is specified by the first optical unit 220, and the optical axis 241 is specified by the second optical unit 230. As illustrated in FIG. 9A, the pallets 402 and 403 are laid out along a pallet arrangement direction 421. The pallets 402 and 403 are respectively provided with inner walls 430 and 431 (partitioning members) for partitioning them from each other. The walls 430 and 431 have similar effects to the partition 500 described in the first exemplary embodiment, and therefore produce occlusion. If occlusion occurs, works hidden by an object cannot be recognized and therefore recognition and picking by the operator or other means is required. Accordingly, the total takt time for picking out works is prolonged. Therefore, it is desirable to reduce occlusion caused by the inner walls 430 and 431. One of factors of occlusion is the distance between the first optical unit 220 and the second optical unit 230. Occlusion occurs in a direction parallel to the plane including the optical axes 240 and 241. Therefore, in order to reduce occlusion caused by the inner walls 430 and 431, it is desirable to lay out the pallet arrangement direction. 421 perpendicularly to the plane including the optical axes 240 and 241.

Since it is difficult for the user to recognize the plane including the optical axes 240 and 241, it is further desirable to indicate the recommended layout position of each of the pallets 402 and 403. Examples of indicating method include displaying an image generated in such a manner that the recommended layout position of each of the pallets 402 and 403 are combined in an image captured by each optical unit included in the distance measurement unit 200. As another example of the indicating method, in a case where the distance measurement unit 200 includes a projection unit, the projection unit is able to generate and project pattern light for indicating the recommended layout position of each of the pallets 402 and 403.

Figure 9B:
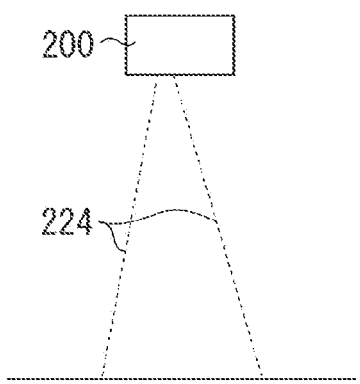
FIGS. 9B and 9C are diagrams each illustrating a configuration example of indicating performed by projection.
Figure 9C:
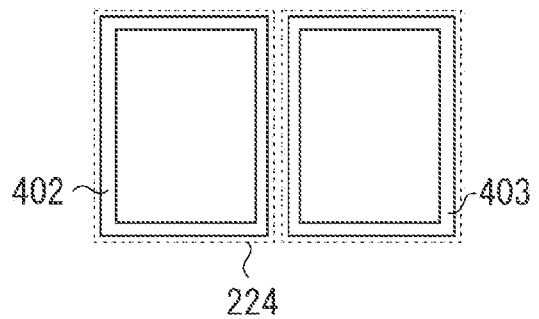
Figure 9D:
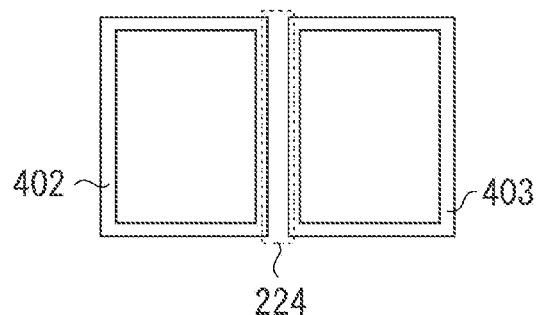
FIG. 9D is a diagram illustrating a recommended wall layout position.

FIGS. 9B and 9O illustrate a configuration example of indicating performed by projection. Projection light 224 indicates the recommended layout position of each of the pallets 402 and 403. The user lays out the pallets 402 and 403 at the irradiation position of the projection light 224, whereby it becomes possible to reduce occlusion caused by the walls 430 and 431. Although, in the present exemplary embodiment, an example for indicating the position of each pallet has been introduced, the indicating method is not limited thereto. It is also possible to more directly indicate the position of the inner walls 430 and 431, at which the pallets 402 and 403 face each other. FIG. 9D illustrates an example in which the projection light 224 indicates the recommended layout positions of the inner walls 430 and 431, at which the pallets 402 and 403 face each other.

Figure 10:
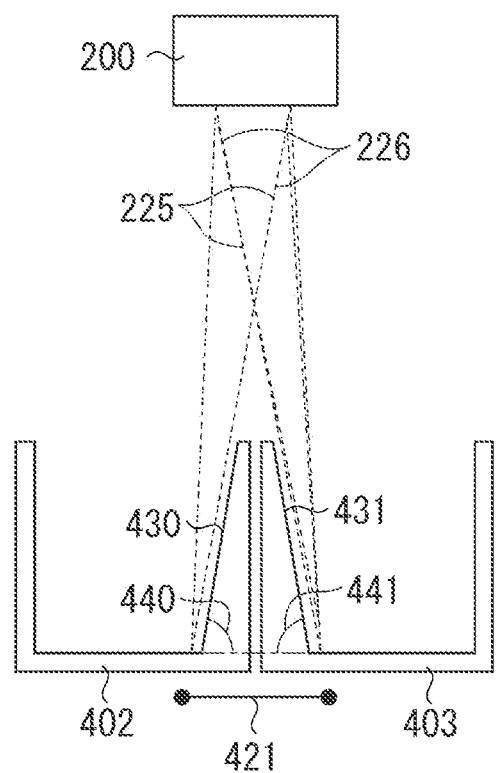
FIG. 10 is a diagram illustrating shapes of partition members for a plurality of pallets.

An example of suitable shapes of the inner walls 430 and 431 will be described below with reference to FIG. 10. FIG. 10 is a cross-sectional view illustrating the inner walls 430 and 431 taken along the pallet arrangement direction 421. Another factor of occlusion caused by the inner walls 430 and 431 is the influence of the opening of each optical unit included in the distance measurement unit 200. Light fluxes 225 and 226 are examples of light fluxes to be used when distance measurement in the vicinity of the inner walls 430 and 431 is performed. Each of the light fluxes 225 and 226 forms a shape that converges in the distance measurement direction according to the size of the opening of each optical unit included in the distance measurement unit 200. When the inner walls 430 and 431 block the converging light fluxes 225 and 226 occlusion occurs. The shapes of the inner walls 430 and 431 suitable for reducing occlusion relate to an acute inclination angle 440 formed by the floor (inner bottom) of the pallet 402 and the inner wall 430 and an acute inclination angle 441 formed by the floor of the pallet 403 and the inner wall 431. This configuration reduces the possibility that the inner walls 430 and 431 block the light fluxes 225 and 226, whereby it becomes possible to reduce occlusion. More specific numerical values of the inclination angles 440 and 441 may be determined based on the size of opening of the distance measurement unit 200, design values of the optical systems, and light flux blocking permissible values, and can be changed within a range in which acute angle conditions are satisfied. To minimize blocking of the light fluxes 225 and 226, it is necessary to set the inclination angles 440 and 441 so that the entire range of the effective diameter of each optical unit included in the distance measurement unit 200 is viewable when the distance measurement unit 200 is viewed from the floors of the pallets 402 and 403.

A fifth exemplary embodiment in which a work recognition apparatus 3 (processing system) is configured as an independent apparatus will be described below. The work recognition apparatus 3 includes the distance measurement unit 200 and the processing unit 100 according to the first exemplary embodiment, and is configured to achieve work recognition. In a case where a work recognition apparatus is made independent in this way, it is possible to design a system by using, for example, the work recognition apparatus 3 according to the present exemplary embodiment, a commercial robot, and the pallets and partition according to the first and the second exemplary embodiments. Since various types of robot manipulators have already been commercially available, the user is able to select one which best suits his or her target application from diverse options. In particular, the provision of the work recognition apparatus 3 according to the present exemplary embodiment is meaningful for users already having a robot.

The work recognition apparatus 3 according to the present exemplary embodiment includes the distance measurement unit 200 and the processing unit 100. The distance measurement unit 200 has a similar configuration to that illustrated in FIG. 5A according to the first exemplary embodiment, i.e., the distance measurement unit 200 includes the first optical unit 220 and the second optical unit 230. The processing unit 100 has a similar configuration to that illustrated in FIG. 1 according to the first exemplary embodiment.

Further, the flow of processes performed by the distance measurement unit 200 and the processing unit 100 for movement of works is similar to the flow according to the first exemplary embodiment. In a process in which the processing unit 100 recognizes works and then outputs a work recognition result, the processing unit 100 outputs information about the positions and orientations of the recognized works to a processing unit of the robot and a relevant control system. Upon reception of this output, the robot is able to pick out works based on the information about the positions and orientations of the works. However, the output information is not limited to the information about the positions and orientations of recognized works, and may include information about the locus of a robot manipulator for picking out works and information about the operation timing of the robot manipulator. The process of outputting the work recognition result may be performed immediately after the recognition process or immediately before the subsequent imaging process. It is possible to change the process so that the work recognition result is output at a suitable timing, by taking into consideration the calculation specifications and output specifications of a computer for performing processing.

The imaging process may include a process of waiting for an input from the robot and the system controlling the robot. This processing aims at starting the subsequent imaging process after completion of an operation for picking out a plurality of recognized works performed by the robot. This process is a process of waiting for an input from an external system which performs timing control for robot operations and imaging process.

The above-described configuration enables providing a processing system for shortening the time interval from when imaging of a plurality of works are performed until when movement of works is completed. It is also possible to configure the processing unit 100 (information processing apparatus) as an independent unit, and combine the processing unit. 100 with various types of distance measurement units and robots.

It is also possible that software (program) for causing the processing unit 100 to perform the above-described processes to be performed by the processing unit 100 is supplied to a system or apparatus via a network object or various types of storage media, and a computer (information processing apparatus) (or a central processing unit (CPU) or micro processing unit (MPU)) of the system or apparatus reads and executes the program.

Other Embodiments

Embodiment(s) of the aspects of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-039404, filed Feb. 27, 2015, which is hereby incorporated by reference herein in its entirety.

What is claimed is:

1. A moving method for moving a plurality of objects by repeating a process of capturing an image of objects, recognizing a position of an object using the image acquired by image capturing, and moving the recognized object, the moving method comprising:
    acquiring, by performing image capturing of a plurality of objects randomly placed in a first state in each of a first space and a second space that are partitioned from each other, an image in the first state;
    recognizing, as first recognizing, a position of a first object in the first space using an image, of a first partial area corresponding to the first space, which is part of the image in the first state;
    recognizing, as second recognizing, a position of a second object in the second space using an image, of a second partial area corresponding to the second space, which is part of the image in the first state;
    moving, as first moving, the first object recognized by the first recognizing;
    moving, as second moving, the second object recognized by the second recognizing; and
    displaying information about a recommended layout of a partitioning member with which the first space and the second space are partitioned from each other.

2. The moving method according to claim 1, wherein, in the displaying, a display unit for displaying an image acquired by image capturing displays the information about the layout in the image.

3. The moving method according to claim 1, wherein, in the acquiring, a projection optical system for projecting pattern light on objects is used for projecting the pattern light on objects and the pattern light reflected by the objects is captured, and
    wherein, in the displaying, the projection optical system projects the pattern light related to the layout.

4. The moving method according to claim 1, wherein the recommend layout of the partitioning member is a recommended direction of the partitioning member.

5. A moving method for moving a plurality of objects by repeating a process of capturing an image of objects, recognizing a position of an object using the image acquired by image capturing, and moving the recognized object, the moving method comprising:
    acquiring, by performing image capturing of a plurality of objects randomly placed in a first state in each of a first space and a second space that are partitioned from each other, an image in the first state;
    recognizing, as first recognizing, a position of a first object in the first space using an image, of a first partial area corresponding to the first space, which is part of the image in the first state;
    recognizing, as second recognizing, a position of a second object in the second space using an image, of a second partial area corresponding to the second space, which is part of the image in the first state;
    moving, as first moving, the first object recognized by the first recognizing; and
    moving, as second moving, the second object recognized by the second recognizing, wherein the first space and the second space are partitioned from each other by a plurality of pallets, and wherein the moving method further includes displaying information about a recommended layout of the plurality of the pallets.

6. The moving method according to claim 5, wherein the recommended layout of the plurality of pallets is an arrangement of the plurality of pallets.

7. A moving method for moving a plurality of objects by repeating a process of capturing an image of objects, recognizing a position of an object using the image acquired by image capturing, and moving the recognized object, the moving method comprising:

acquiring, by performing image capturing of a plurality of objects randomly placed in a first state in each of a first space and a second space that are partitioned from each other, an image in the first state;

recognizing, as first recognizing, a position of a first object in the first space using an image, of a first partial area corresponding to the first space, which is part of the image in the first state;

recognizing, as second recognizing, a position of a second object in the second space using an image, of a second partial area corresponding to the second space, which is part of the image in the first state;

moving, as first moving, the first object recognized by the first recognizing; and moving, as second moving, the second object recognized by the second recognizing, wherein, in the acquiring, a plurality of optical systems for triangulation is used for capturing an image of objects in a pallet, and wherein, in the acquiring, a partitioning member for partitioning the first space and the second space from each other is provided in such a manner that an angle formed by a side surface of the partitioning member and an inner bottom of the pallet becomes an acute angle in a cross section perpendicular to a plane including optical axes of the plurality of optical systems.

* * * * *